US006854286B2

(12) United States Patent
Bureau et al.

(10) Patent No.: US 6,854,286 B2
(45) Date of Patent: Feb. 15, 2005

(54) AIR-CONDITIONER FOR A MOTOR VEHICLE

(75) Inventors: Cathy Bureau, Stuttgart (DE); Roland Burk, Stuttgart (DE); Gottfried Duerr, Stuttgart (DE); Guenther Feuerecker, Stuttgart (DE); Kurt Molt, Bietigheim-Bissingen (DE); Gerald von Rappard, Cologne (DE); Wolfgang Seewald, Stuttgart (DE); Brigitte Taxis-Reischl, Stuttgart (DE); Marcus Weinbrenner, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/704,557

(22) Filed: Nov. 12, 2003

(65) Prior Publication Data

US 2004/0093889 A1 May 20, 2004

Related U.S. Application Data

(62) Division of application No. 10/024,627, filed on Dec. 21, 2001, now Pat. No. 6,691,527.

(30) Foreign Application Priority Data

| | | |
|---|---|---|
| Jan. 5, 2001 | (DE) | 101 00 252 |
| Sep. 15, 2001 | (DE) | 101 45 658 |
| Sep. 15, 2001 | (DE) | 201 15 273 U |
| Oct. 18, 2001 | (DE) | 101 50 896 |

(51) Int. Cl.[7] .................................................. B60H 1/32
(52) U.S. Cl. .............................. 62/244; 62/305; 62/524
(58) Field of Search .......................... 62/244, 305, 430, 62/524; 165/10, 168, 183

(56) References Cited

U.S. PATENT DOCUMENTS

| | | | | | |
|---|---|---|---|---|---|
| 4,306,613 | A | * | 12/1981 | Christopher | 165/276 |
| 4,354,359 | A | * | 10/1982 | Hall et al. | 62/299 |
| 4,412,426 | A | * | 11/1983 | Yuan | 62/260 |
| 4,637,222 | A | * | 1/1987 | Fujiwara et al. | 62/244 |
| 4,735,064 | A | * | 4/1988 | Fischer | 62/430 |
| 5,483,807 | A | | 1/1996 | Abersfelder et al. | |
| 5,704,221 | A | * | 1/1998 | Lego | 62/278 |
| 5,934,092 | A | | 8/1999 | Krompass et al. | |
| 6,079,481 | A | * | 6/2000 | Lowenstein et al. | 165/10 |
| 6,101,830 | A | * | 8/2000 | Feuerecker | 62/304 |
| 6,260,376 | B1 | | 7/2001 | Khelifa et al. | |

FOREIGN PATENT DOCUMENTS

| | | | |
|---|---|---|---|
| DE | 37 04 182 | A1 | 8/1988 |
| DE | 43 27 866 | C1 | 9/1994 |
| DE | 196 45 178 | A1 | 5/1998 |
| DE | 197 29 497 | A1 | 1/1999 |
| DE | 197 49 793 | A1 | 5/1999 |
| DE | 198 31 256 | A1 | 1/2000 |
| DE | 198 60 057 | A1 | 7/2000 |
| EP | 0 995 621 | A2 | 4/2000 |

* cited by examiner

*Primary Examiner*—Melvin Jones
(74) *Attorney, Agent, or Firm*—Foley & Lardner LLP

(57) ABSTRACT

The invention relates to an air-conditioner having a heat exchanger, such as an evaporator, for example, with a reservoir for a cold storage medium.

17 Claims, 6 Drawing Sheets

AIR-CONDITIONER FOR A MOTOR VEHICLE

CROSS-REFERENCE TO RELATED PATENT APPLICATIONS

The right of priority under 35 U.S.C. §119(a) is claimed based on German Patent Applications No. 101 00 252.1, filed Jan. 5, 2001, No. 201 15 273.8, filed Sep. 15, 2001, No. 101 45 658.1, filed Sep. 15, 2001, and No. 101 50 896.4, filed Oct. 18, 2001, the disclosures of which are hereby-incorporated by reference.

BACKGROUND OF THE INVENTION

The present invention relates to an air-conditioner for a motor vehicle, especially one having a compressor arranged in a refrigerant circuit and an evaporator for the cooling of air to be conditioned for the passenger compartment. More particularly, the present invention relates to such air-conditioning systems that embody a cold storage medium.

Motor vehicle manufacturers are striving to reduce the fuel consumption of their vehicles. One measure for reducing the fuel consumption is to cut off the engine while at a temporary standstill, such as when stopping at a traffic light, for example, or under other driving conditions, in which a drive power output of the engine is, at least temporarily, not needed. This temporary engine cut-off is also known as idle-stop mode. Such measures are already at least partially used in present-day fuel-saving vehicles, such as the so-called "three-liter" vehicle, for example. In vehicles having the idle-stop operating mode, the engine is shut off for approximately 25–30% of the journey time in urban traffic.

This is one reason why such vehicles are not equipped with an air-conditioner. With the engine shut off, the compressor essential to an air-conditioner cannot be powered either, and therefore in the idle-stop mode an air-conditioner cannot provide the necessary refrigeration capacity.

To solve this problem it is proposed in EP 0 995 621 A2 to use the condensate produced in the cooling of moist air to ice-up the evaporator of the air-conditioner, so that in the idle-stop mode, when the engine is shut off, the air can be cooled by the then melting ice. This method has numerous disadvantages, however. The quantity of water that is present in the air and is needed for icing-up of the evaporator varies as a function of the ambient climatic conditions. Thus, it may happen that, with low air humidity there is insufficient condensation water available to ice-up the evaporator. Furthermore, a relatively long, period of time is generally needed for icing-up of the evaporator, so that this known air-conditioner can function in idle-stop mode only after a relatively long driving time. Another problem is that the evaporator generally ices-up unevenly, so that the evaporator has some areas that are iced-up and some areas that are not. Furthermore, icing may be so intense that the air can flow through the evaporator only with a high pressure loss, if at all. In any case, the layer of ice produces a pressure loss on the air side, which leads to the need for an increased blower output.

SUMMARY OF THE INVENTION

One primary object of the invention is to provide an air-conditioner which at least initially ensures air conditioning of the vehicle in many or essentially in all operating and ambient conditions, including the idle-stop situation when the engine of the vehicle is shut off.

In accomplishing these and other objects, there has been provided in accordance with one aspect of the present invention an air-conditioner for a motor vehicle having a passenger compartment, comprising: a refrigerant circuit comprising a compressor and first and second evaporator sections for cooling air to be conditioned for the passenger compartment, the second evaporator section being adapted for containing a cold storage medium; and an air-directing mechanism for selectively directing air to be conditioned either through each evaporator section individually or through both evaporated sections together. In one preferred embodiment, the evaporation sections comprise separate evaporators, whereas in another preferred embodiment, the evaporator sections comprise a single evaporator having at least two sections.

In accordance with another aspect of the invention, there has been provided a heat exchanger suitable for use as an evaporator, comprising: a pair of manifold sections, with a first manifold section having an inlet and a second manifold section having an outlet; a plurality of refrigerant tubes having refrigerant channels provided therein and communicating at least between the manifold sections; and at least one reservoir for a cold storage medium, wherein at least some of the refrigerant tubes are thermally connected to the cold storage medium reservoir.

According to still another aspect of the invention, there has been provided an air-conditioner for a motor vehicle having a passenger compartment, comprising: a refrigerant circuit comprising a compressor and first and second evaporator sections for the cooling of air to be conditioned for the passenger compartment, wherein the second evaporator section is adapted for containing a cold storage medium.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

Figure 1:
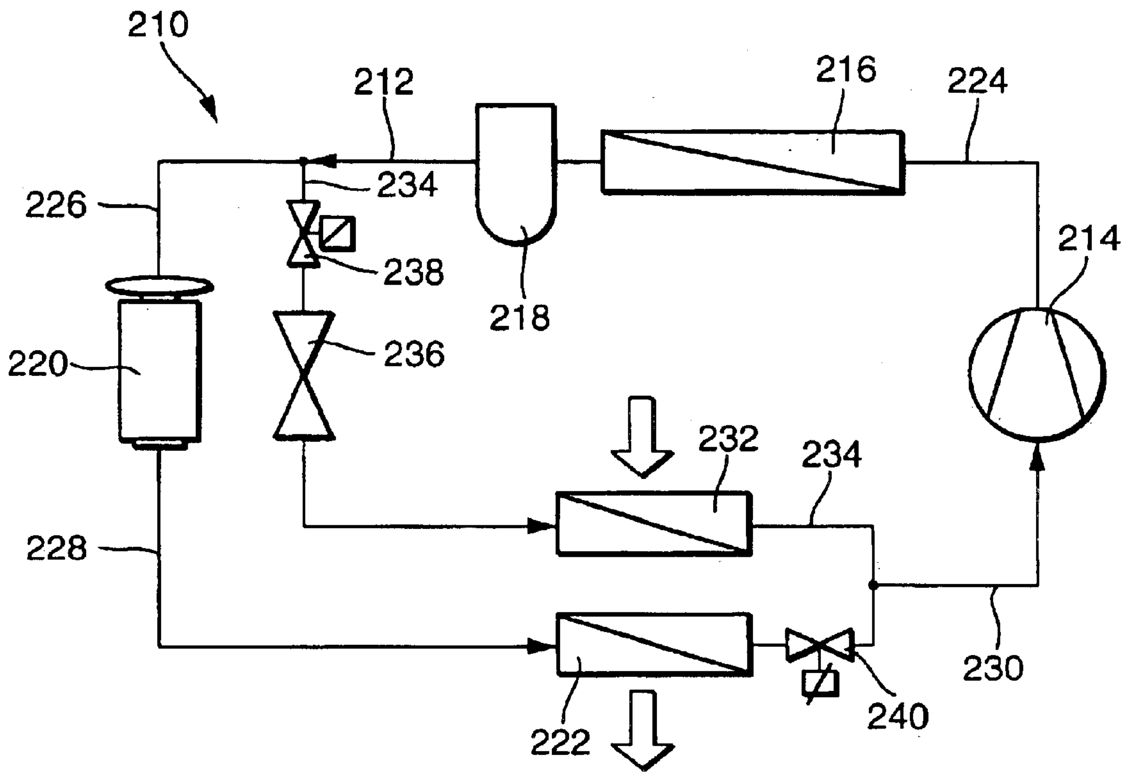
FIG. 1 is a block circuit diagram of a refrigerant circuit of an air-conditioner according to a first exemplary embodiment of the invention.

In a first embodiment according to the invention, an additional, second evaporator is provided for cooling the air.

This evaporator additionally contains a cold storage medium (latent cold store). The second evaporator can then be charged when sufficient refrigeration capacity is available, for example, in the ordinary driving mode, and it is possible to adjust the cold storage medium for the optimum storage of cold. In the idle-stop mode, the air is then cooled by this second evaporator. This second evaporator therefore forms a combined cold accumulator and evaporator and will hereinafter also be referred to as a storage evaporator. In order to produce the maximum refrigeration capacity (pull-down mode), the air can also be fed simultaneously through both evaporators.

According to a second embodiment, the evaporator is divided up into at least two sections, with a first section being capable of acting exclusively as refrigerant evaporator and a second section additionally containing a cold storage medium. The second section of the evaporator thereby has essentially the same characteristics as the above-mentioned storage evaporator in the first solution. In this second solution, therefore, the functions of the evaporator in the driving mode and of the storage evaporator in the idle-stop mode are incorporated into a single evaporator, that is to say, a single component. Here too, as a third possibility the air can be fed through both evaporators in order to produce the maximum refrigeration capacity.

The storage evaporator or the storage section is preferably connected in parallel on the refrigerant side to the first evaporator or first section, so that the refrigeration capacity can be delivered either to the first or second evaporator or evaporator section. At the same time the flow of refrigerant through the storage evaporator or the second section can be regulated by a valve. Alternatively, a series connection of the evaporators or evaporator sections is also possible.

If the two evaporators or the two evaporator sections are connected in parallel on the air side, the air to be cooled can be led either through both evaporators or evaporator sections or through just one. In the idle-stop mode, this means that, while driving, for example, when the engine is running, the air can be cooled by the first evaporator or evaporator section, and with the engine shut off the air can be cooled by the storage evaporator or second evaporator section. The air flow can be switched over by an air flow control element arranged upstream of the evaporator.

The melting point of the cold storage medium is preferably somewhat in excess of 0° C. The cold storage medium in particular is or contains decanol (melting point 7° C.) or tetradecane (melting point 6° C.). Cold storage media of this type can also be used for other storage evaporators and/or other circuits. In a cost-effective embodiment, the cold storage medium is a water-glycol mixture.

Advantageously, both fresh air and a recirculated air operation are possible, so that, for example, air already cooled can be recirculated in the passenger compartment again, thereby saving refrigeration capacity.

In one possible embodiment of the storage evaporator or the second evaporator section, the evaporator tubes for carrying the refrigerant can be designed as multiple channel tubes, so that it is possible to store the cold storage medium in individual channels.

In another preferred embodiment, at least some refrigerant tubes are thermally connected to at least one reservoir for cold storage medium. In this case it is expedient for at least one refrigerant tube to be arranged in such a way that a reservoir for a cold storage medium is arranged on at least one side of the refrigerant tube. According to one embodiment of the invention, it is expedient for a reservoir to be arranged on only one side of the refrigerant tube. In a further embodiment according to the invention, reservoirs may be arranged on both sides of the refrigerant tube. The reservoir may also be connected at one lateral face to the refrigerant tube and on the other of its lateral faces to a fin. In addition, the refrigerant tube may be connected at one lateral face to a reservoir and on the other of its lateral faces to a fin.

According to the invention, the components of the heat exchanger may be arranged in a transverse direction to the direction of the air flow through the heat exchanger in such a way that arrangement is in the following order: refrigerant tube, reservoir, fin, refrigerant tube, reservoir, fin. In a further exemplary embodiment according to the invention, the components of the heat exchanger in a transverse direction to the air flow may also be characterized by the following order of arrangement: refrigerant tube, reservoir, fin, reservoir, refrigerant tube, reservoir, fin, reservoir, refrigerant tube. In another exemplary embodiment of the invention, it may be-expedient for the components of the heat exchanger in a transverse direction to the direction of the air flow through the heat exchanger to be characterized by the following order of arrangement: refrigerant tube, fin, reservoir, fin, refrigerant tube, fin, reservoir, fin, refrigerant tube. These arrangements are exemplary only.

It is particularly expedient for at least one reservoir and at least one refrigerant tube to be connected together, for example brazed, positively interlocked or the like. In the same way it may be expedient for at least one reservoir and at least one refrigerant tube to be integrally formed, i.e., the two elements are part of one component and are therefore an integral constituent part of the component.

The invention will be explained in more detail below on the basis of exemplary embodiments and with reference to the drawings.

Turning now to the drawings, in FIG. 1 an air-conditioner 210 according to the invention comprises a refrigerant circuit 212, in which a compressor 214, a refrigerant condenser 216, a refrigerant collecting reservoir 218, an expansion valve 220 and an evaporator 222 are connected to one another by refrigerant pipes 224, 226, 228 and 230.

On the refrigerant side, parallel to the first evaporator 222, a second evaporator 232 is incorporated into the refrigerant circuit 212, by a refrigerant pipe 234 branching off from the refrigerant pipe 226 and then rejoining the refrigerant pipe 230 downstream of the first evaporator 222. An expansion element 236 and a shutoff valve 238 are arranged in the refrigerant pipe 234 upstream of the second evaporator 232. The shutoff valve 238 is capable of blocking the flow of refrigerant through the second evaporator 232. A shutoff valve 240 is similarly provided downstream of the first evaporator 222, so that the flow of refrigerant through the first evaporator 222 can also be shut off.

The first evaporator 222 may be of any known construction and therefore is not represented in more detail here. This may be a flat tube evaporator, for example, in which flat tubes connected in parallel on the refrigerant side extend between two manifolds, and in which heat-dissipating corrugated fins are provided between the flat tubes. Such an evaporator is disclosed, for example, by DE 197 29 497 A1, which is incorporated herein by reference.

Figure 11:
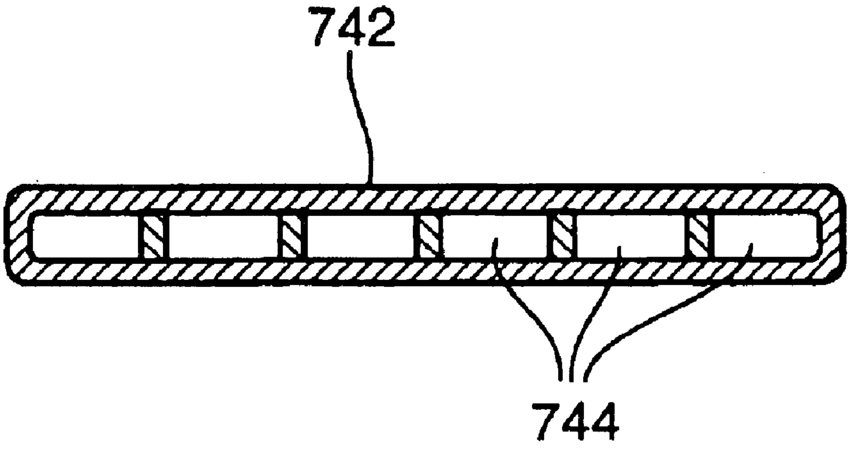
FIG. 11 is a cross-sectional view through an evaporator tube for carrying refrigerant.
Figure 12:
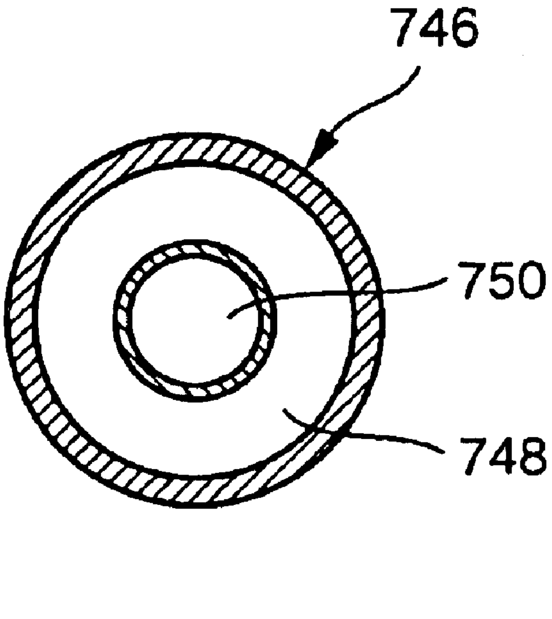
FIG. 12 is a cross-sectional view through another evaporator tube for carrying refrigerant.

The second evaporator 232 may be of similar construction to the first evaporator 222, but this evaporator in addition contains a cold storage medium, which may be contained, for example, in the individual tubes of the evaporator. These tubes may be designed, for example, as multiple channel flat tubes 742 according to FIG. 11, whereby it is possible to store the cold storage medium in some of the channels 744 and to have the refrigerant flowing in the other channels 744. In an alternative embodiment, the evaporator tubes 746 may also be designed as coaxial tubes, whereby it is possible to store the cold storage medium in the outer tube or channel 748, for example, while the refrigerant can flow in the inner tube or channel 750. See FIG. 12.

Figure 4:
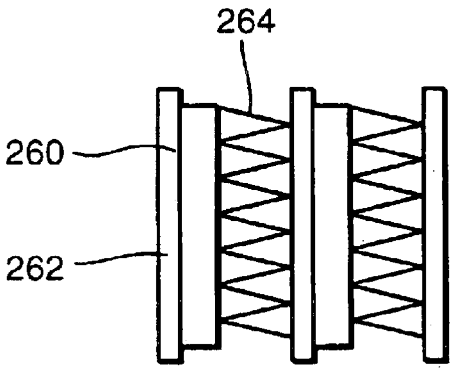
FIG. 4 is a diagrammatic representation of an evaporator according to an alternative embodiment.

According to an alternative embodiment represented diagrammatically in FIG. 4, the cold storage medium can be incorporated into the evaporator in a tube 260 or vessel located between an evaporator tube 262 and a heat-dissipating fin 264.

The second evaporator 232 can therefore store refrigeration capacity by way of the cold storage medium, so that this evaporator is hereinafter referred to as storage evaporator and represents an integrated form of cold reservoir and evaporator. Decanol or tetradecane, for example, may be used as a preferred cold storage medium. The cold storage medium advantageously has a phase change of approx. 3° C. to 10° C., preferably 3° C. to 5° C. Of course, many cold storage media of this type are known and are suitable for use in the invention.

Figure 2:
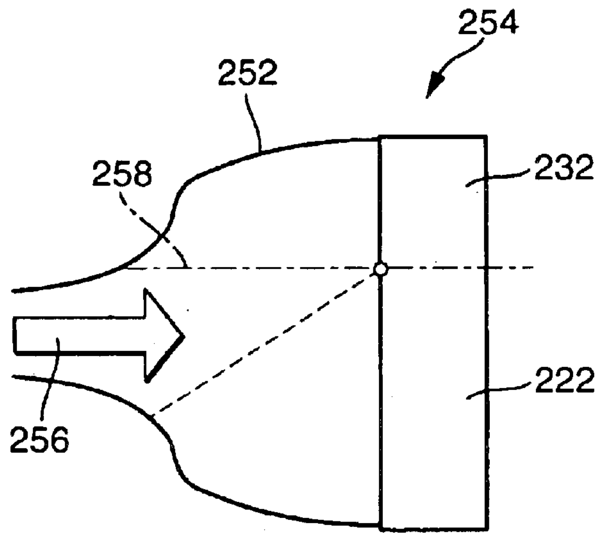
FIG. 2 is a side view of a highly diagrammatic representation of a part of an air-conditioner with evaporator.

FIG. 2 shows how the two evaporators 222 and 232 might be used in an air-conditioner for cooling the air. The evaporators 222 and 232 are arranged in a known manner in an air duct housing 252 of the air-conditioner 254. Air-Conditioners of this type are generally located in the dashboard of the motor vehicle. Air can be conveyed through the evaporators 222 and 232 in the direction of the arrow 256 by a blower, which is conventional and therefore not represented further. That part of the air-conditioner 254 adjoining the evaporators on the downstream air side, which conventionally contains a heater and various air flaps and air ducts for the individual air outlets are generally arranged, is not represented further in FIG. 2. On the upstream air side of the evaporators 222 and 232, an air flow control element 258 is arranged in such a way that, in one limit position of the air flow control element 258, the air is guided through the first evaporator 222, and in the other limit position (dashed line in FIG. 2), the air is guided through the second evaporator 232. Here, the air flow control element 258 shuts off whichever evaporator 222 or 232 has no air flowing through it.

In the stationary state when the engine is in operation, the air is led through the first evaporator 222, and the second evaporator 232 is shut off on the air side. The second evaporator 232, however, has refrigerant flowing through it so that the cold storage medium can freeze.

When the engine is shut off (idle-stop mode), with the result that the compressor 214 is also inoperative, the air, in order to be able to continue cooling the passenger compartment of the motor vehicle, is led through the second evaporator 232, whereby the cold storage medium cools the air.

In addition to the two aforementioned limit positions of the air flow control element 258, it can assume a further position, in which the air is led both through the first evaporator 222 and through the second evaporator 232, so that the maximum refrigeration capacity is available. This position is assumed when the maximum refrigeration capacity is needed in pull-down mode.

Figure 3:
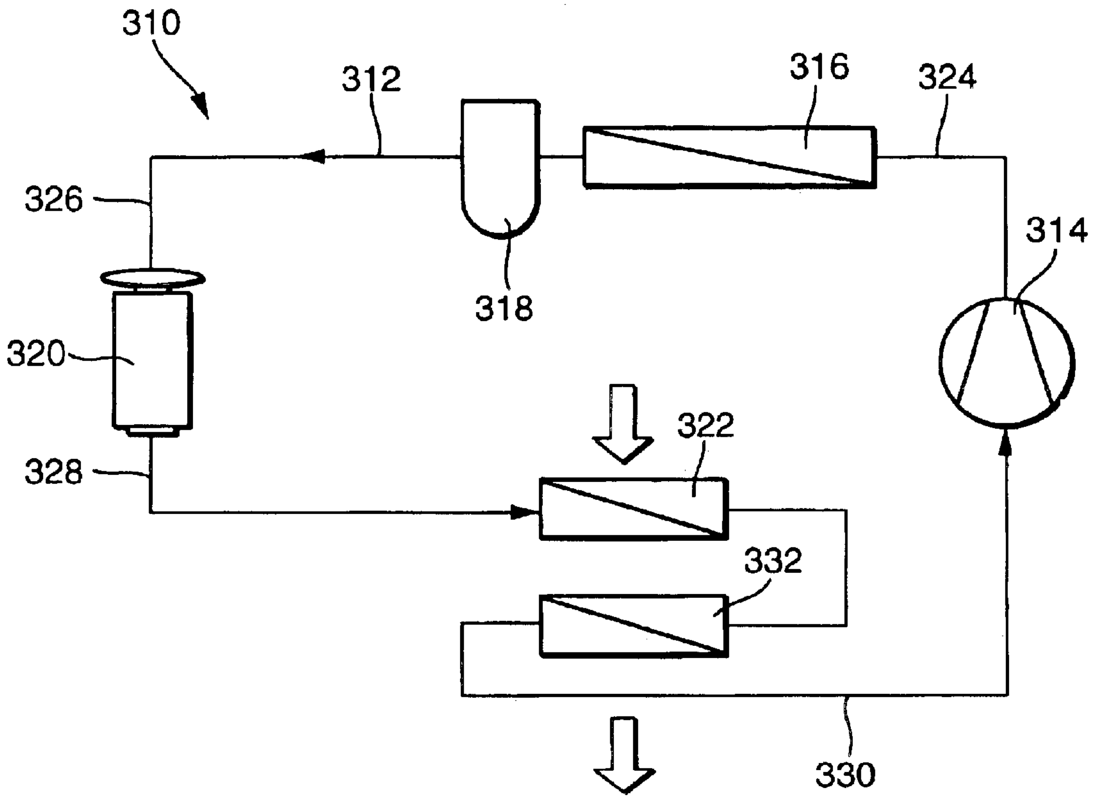
FIG. 3 is a block circuit diagram of a refrigerant circuit of an air-conditioner according to a further exemplary embodiment of the invention.

According to a further exemplary embodiment represented in FIG. 3, in which the same or equivalent components are given reference numbers increased by 100, two evaporators 322 and 332 in an air-conditioner 310 are connected in series in a refrigerant circuit 312, so that the refrigerant circuit 312 comprises only a compressor 314, a refrigerant condenser 316, a refrigerant collecting reservoir 318, an expansion valve 320 and the first evaporator 322 and the second evaporator 332, which are connected to one another by refrigerant pipes 324, 326, 328, 330. Here, the second evaporator 332, which can store cold by means of a cold storage medium, is connected to the first evaporator 322 on the outlet side in the refrigerant circuit 312. It may, however, also be connected to the evaporator 322 on the refrigerant inlet side. The same media as in the first exemplary embodiment may be used as cold storage media. The ducting of the air to be cooled through the two evaporators 322 and 332 preferably corresponds to that in the first exemplary embodiment.

In the exemplary embodiments shown, a first evaporator 222 or 322 and a second evaporator 232 or 332 are provided. In a further possible embodiment, which is not shown in more detail, the two evaporators 222 or 322 and 232 or 332 may also form a common unit, i.e., so that it is then a single evaporator having two sections. The first section corresponds to the evaporator 222 or 322 and has only refrigerant-vaporizing characteristics, and the second section corresponds to the storage evaporator and contains the cold storage medium in addition. Like the storage evaporator 232 and 332, this second section may have the cold storage medium in its individual evaporator tubes, or it may, however, correspond to the other, aforementioned exemplary embodiments.

By means of the invention, therefore, an air-conditioner is created, in which two evaporators 222 and 232 or 322 and 332, or one evaporator with two sections, are arranged in a single air conditioning unit. Such a design does not take up significantly more overall space than hitherto known air-conditioning units, and it has the characteristics mentioned. With this air-conditioner, cooling and hence air-conditioning are possible both while driving and in the idle-stop mode with the engine temporarily shut off.

Figure 5:
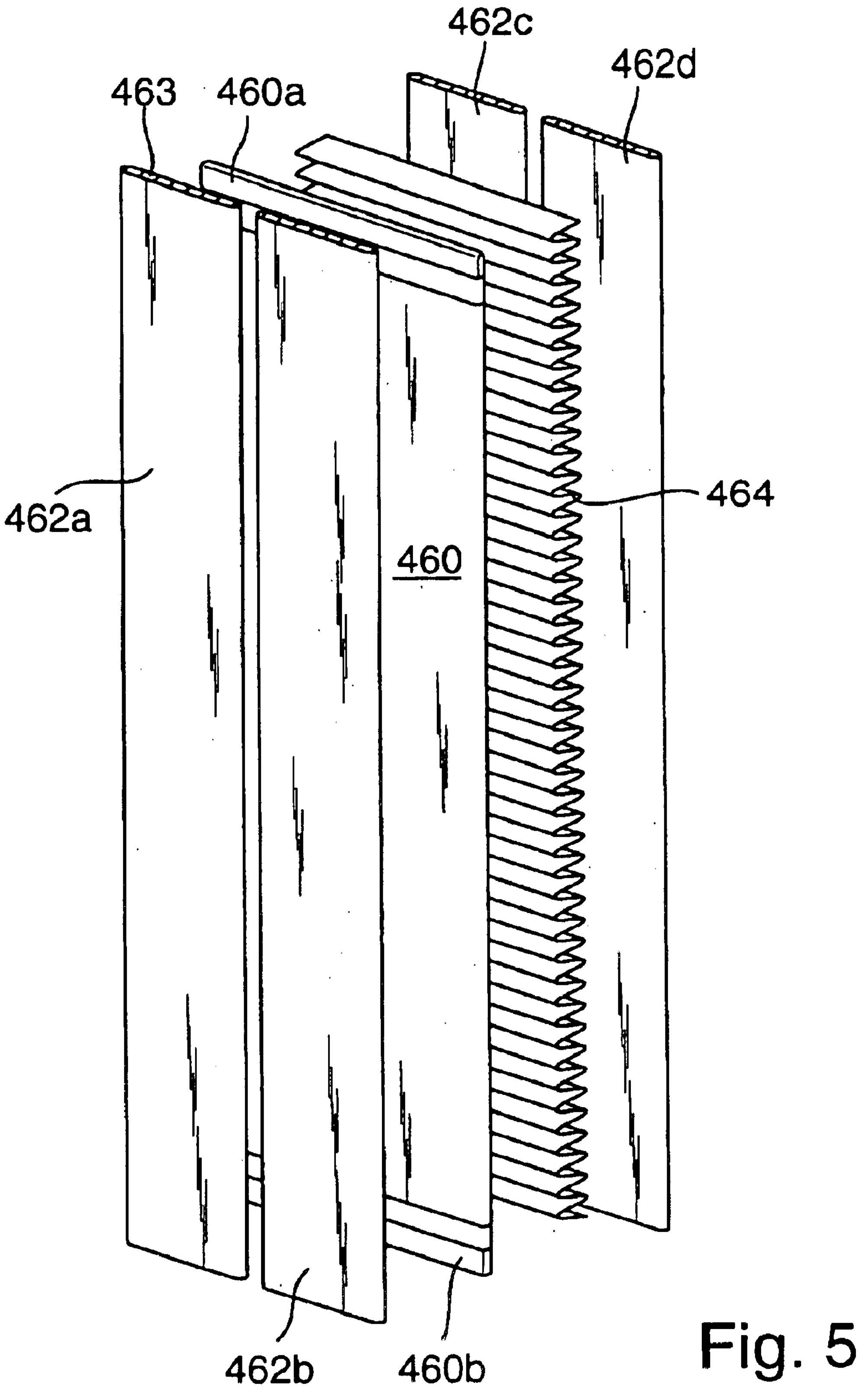
FIG. 5 is an exploded view showing details and components of an evaporator according to the invention.

FIG. 5 shows a preferred arrangement of components of an evaporator, such as a flat tube evaporator, for example. In the exemplary embodiment, the flat tubes 462*a* to 462*d* are each arranged in pairs, so that two flat tubes 462*a* and 462*b* and similarly the two flat tubes 462*c* and 462*d* in each case form a row, viewed in the direction of flow of the air. Instead of the two flat tubes or other refrigerant tubes in each case, however, just one flat tube or refrigerant tube may b provided per row, viewed in the direction of flow of the air, or a plurality of flat tubes or refrigerant tubes. The flat tubes appropriately have a plurality of individual channels 463, through which the refrigerant flows when the evaporator is in operation. The refrigerant tubes or flat tubes are each connected at their ends to manifold sections, and the channels 463 have a fluid connection to these manifold sections.

At least one reservoir 460 for a cold storage medium is advantageously arranged between two rows of flat tubes. At the same time it may be advantageous if the at least one reservoir has essentially the same overall height and depth as the refrigerant tubes used in each row or as the evaporator itself. In another exemplary embodiment, it may also be expedient, however, for the reservoir to extend to a lesser or greater extent, depthwise and/or heightwise beyond the refrigerant tubes or the evaporator itself.

It is advantageous for this at least one reservoir 460 to abut on one side with one or more flat tubes 462*a*, 462*b* or is even to be solidly joined to this at least one flat tube, or to be integrally formed with the at least one flat tube. The reservoir may in this case have essentially the same dimension as the flat tubes or essentially the depthwise dimension of the evaporator. In the exemplary embodiment in FIG. 5, the reservoir is formed from a flat tube, which is closed at both of its ends, 460*a* and 460*b*. This closure may be achieved, for example, by folding or some other method, such as brazing or the use of a sealing closure, such as a plug stopper.

In addition, a heat-dissipating fin 464 may be provided between two rows of flat tubes. It is expedient for this fin 464 to be arranged on one side of the flat tubes between the flat tube(s) and reservoir.

Figure 6:
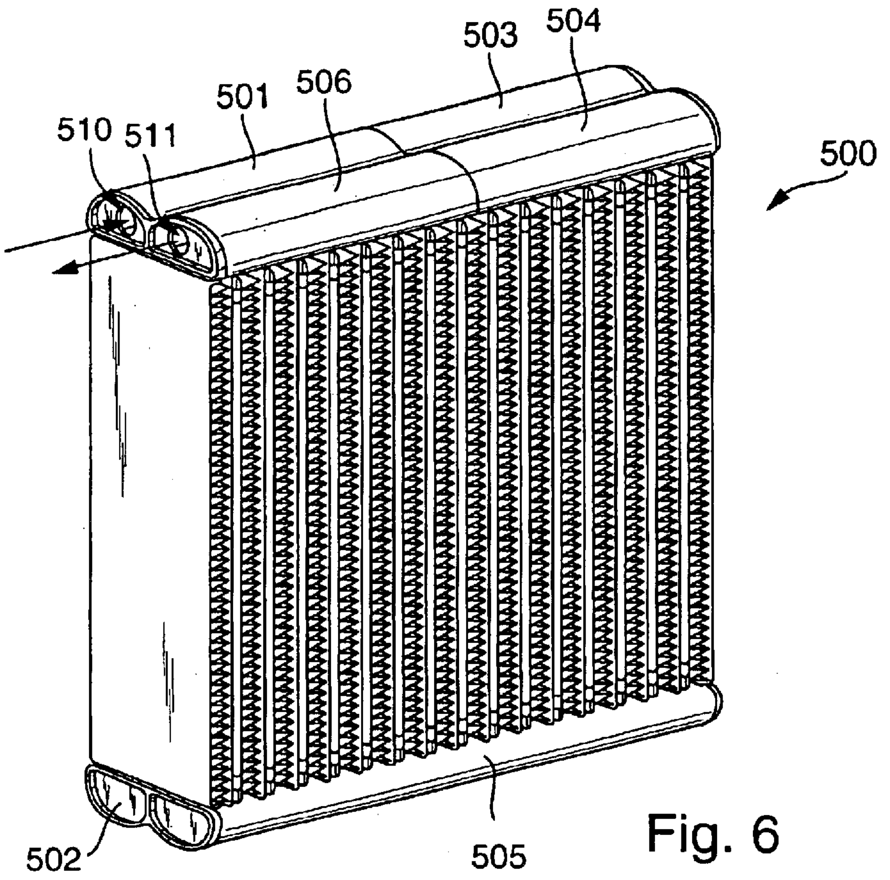
FIG. 6 is a perspective view of an evaporator.
Figure 7:
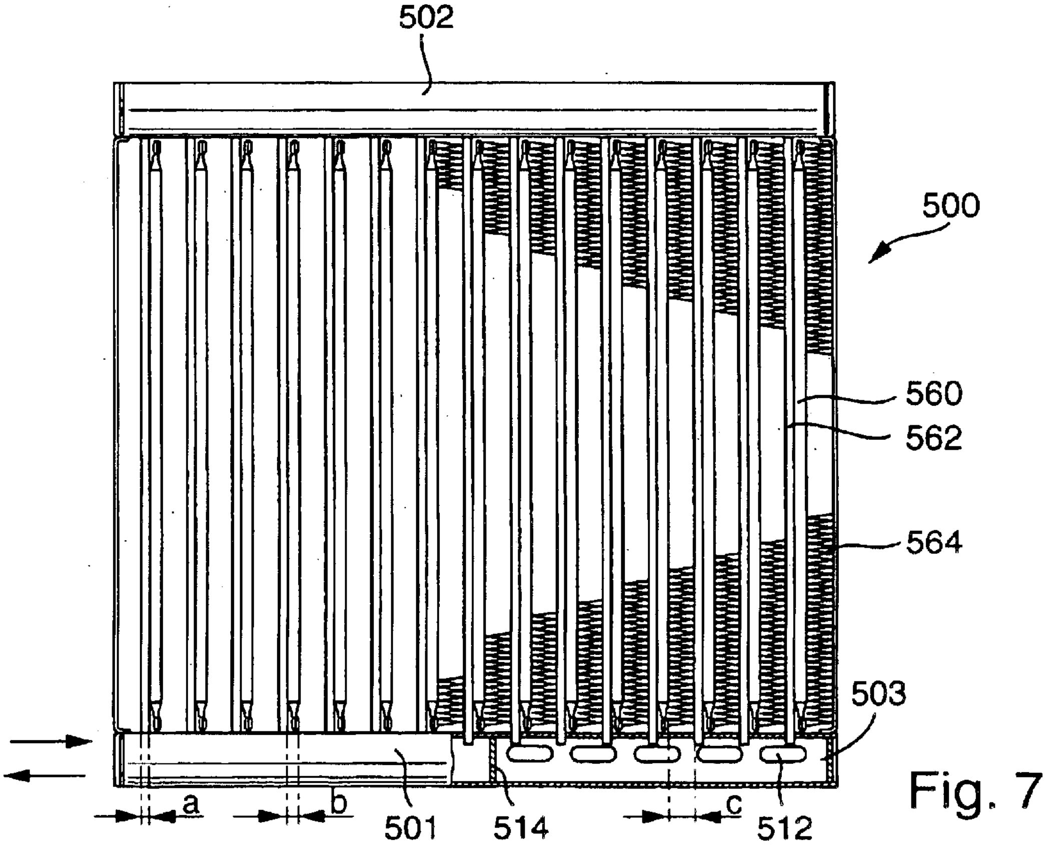
FIG. 7 is a front view of an evaporator.

FIG. 6 shows an evaporator, such as a flat tube evaporator 500, in a three-dimensional view, and FIG. 7 shows such an evaporator in a two-dimensional view (inverted). The evaporator, or storage evaporator 500 in this case, has a series of flat tubes, reservoirs and fins, which are arranged according to FIG. 5. In addition, the evaporator has manifold or header sections 501 to 506, which each have a fluid connection to at least some of the flat tubes as refrigerant pipes. The refrigerant flows into the evaporator 500 in the area of the inlet opening 510 and out again in the area of the outlet opening 511. The refrigerant enters the manifold section 501 through the opening 510, from there passes by way of the refrigerant channels in the flat tubes into the manifold section 502 and from there through refrigerant channels in the flat tubes into the manifold section 503. From there the refrigerant passes through at least one connection 512 into the manifold section 504. From there the refrigerant passes through channels in the flat tubes into the manifold section 505, to pass through channels again in the manifold section 506. The refrigerant then leaves by the opening 511. Between the manifold sections 501 and 503, and 504 and 506, dividing walls 514 are provided, which separate the various areas from one another. The flat tubes of the evaporator 500 are denoted by 562. Reservoirs 560 and fins 564 are arranged between the rows of flat tubes. For the sake of clarity, not all fins are drawn in, and some of the fins are only partially represented.

According to the exemplary embodiment in FIGS. 6 and 7, manifold sections are arranged at both ends of the refrigerant tubes. In, another advantageous exemplary embodiment, it may be expedient for manifold sections to be arranged only on one side of the refrigerant tubes, so that there is a deflection at the other end of each of the refrigerant tubes. This deflection may occur in the tube itself, for example.

It is expedient for the flat tubes or refrigerant tubes to have a dimension transversely to the air flow direction in the range from approximately 1 mm to 5 mm, preferably from 1.5 mm to 3 mm. In addition, it is advantageous if the width b of the reservoir transversely to the air flow direction lies in the range from 1 mm to 10 mm, preferably from 1.5 mm to 6 mm. It is also expedient for the width c of the fins transversely to the air flow through the evaporator to lie in the range from 3 mm to 12 mm, preferably from 4 mm to 10 mm. It is also advantageous if the ratio of the width of the reservoir to the width of the refrigerant tubes lies in the range from 0.25 to 2, preferably in the range from 0.5 to 1.5. These dimensions are preferred, exemplary dimensions only.

Figure 8:
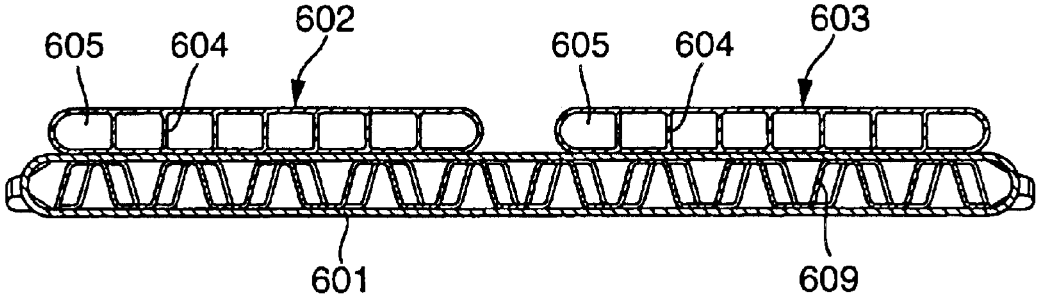
FIG. 8 is a cross-sectional view through a part of an evaporator.

FIG. 8 shows a section through one embodiment of a reservoir 601 for cold storage medium and two flat tubes 602, 603, which are connected to the reservoir 601. The flat tubes take the form, for example, of extruded flat tubes and have a plurality of channels 605, which each separately ensures a fluid connection between the end areas of the flat tube. The refrigerant channels 605 are separated from one another, for example, by webs 604. The channels 605 may have any shape, for example, rectangular, polygonal such as triangular or pentagonal, oval or circular in cross section.

The flat tubes 602 and 603 are fixed to the reservoir 601, by forming in one piece, for example. According to the invention, the two flat tubes can also be connected to form one flat tube, or one or more flat tubes can also be used instead of two flat tubes. According to the invention, a plurality of reservoirs or storage tubes may be used side by side. In its interior, the reservoir 601 also shows a mechanical brace 609, which is formed by a correspondingly designed support element, such as a support plate, for example, which can be inserted into the reservoir interior. This serves for mechanical reinforcement or bracing. It is advantageous if this support element is reinforced by deep drawn areas or angled areas.

Figure 9:
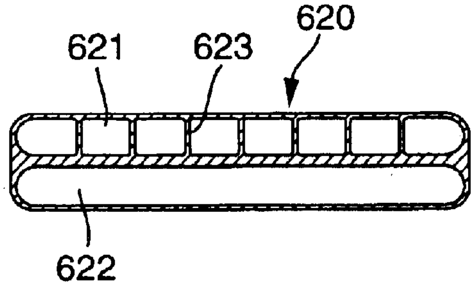
FIG. 9 is a cross-sectional view through a part of an evaporator.

FIG. 9 shows an exemplary embodiment of a reservoir and a flat tube, wherein the two are integrally formed. The reservoir 622 is manufactured in one piece with the flat tube 620. The flat tube part is designed with channels 621, and these are separated from one another by the webs 623. The reservoir 622 therefore virtually forms a part of a double tube. To form a chamber for the storage medium, the reservoir may be closed, for example, by a plug stopper.

Figure 10:
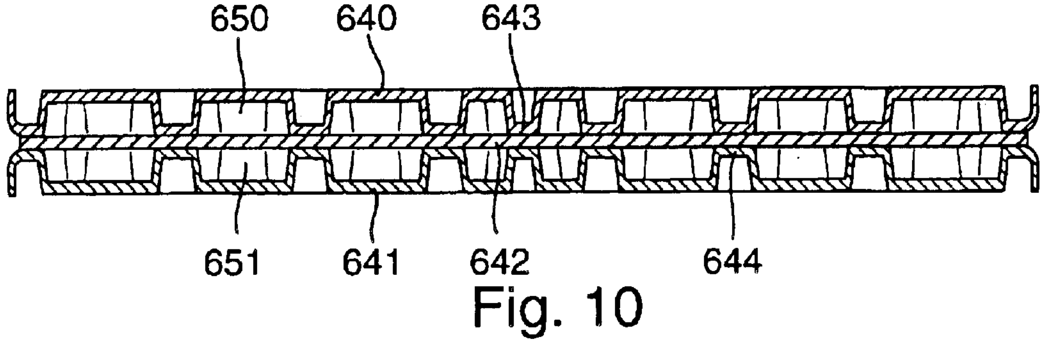
FIG. 10 is a cross-sectional view through a part of an evaporator.

FIG. 10 shows a further advantageous embodiment of a storage evaporator component made by a plate construction. The channels for the refrigerant and the chambers for the storage medium are each formed by a plate 640 and where necessary an intermediate plate 642 or by the plate 641 and the intermediate plate 642. The forming of the plates 640 and 641 by deep drawing produces a space between each of the plates 640 and 641 and the part 642. This space can be used either as channels or as a refrigerant chamber. By deep drawing it is possible to form webs or fins, or knobs or cups, which serve for reinforcement or bracing. The individual components are connected to one another in such a way that the intermediate spaces are sealed fluid-tight as refrigerant channels 650 and as reservoir volume(s) 651. At connection points, the channels can then be connected to the refrigerant circuit, or the chambers filled with the cold storage medium. The design of an evaporator having a plate construction may be advantageous in many applications. The refrigerant channels of plate construction therefore also represent a refrigerant tube within the meaning of the present description, which is characterized by the structure and by the use of at least single plates, wherein at least one refrigerant channel is produced by at least two plates.

The cold accumulators of the evaporator or heat exchanger can each be connected to one another or are connectable by means of at least one connecting pipe, by way of which they can be also be filled and/or bled, for example. At least, individual reservoirs can also be connected to a storage vessel, such as a storage tank, so that the storage medium from this tank can be transferred into the reservoirs. In the operation of the heat exchanger, this storage vessel can then be sealed or reopened, and if necessary also resealed.

It is especially expedient for the cold storage medium to be used in such a way that the quantity of medium used is sufficient to ensure the necessary refrigeration capacity for a period of approximately 30 to 120 seconds, preferably approximately 60 seconds, even with the compressor drive shut off. Where decanol or tetradecane is used as the cold storage medium, this corresponds to a used quantity of approximately 200 ml, ranging up to approximately 500 ml. to 1000 ml.

The foregoing, description of preferred embodiments of the invention has been presented for purposes of illustration and description. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto and that the claims encompass the disclosed embodiments and their equivalents.

What is claimed is:

1. A heat exchanger suitable for use as an evaporator, comprising:

a pair of manifold sections, with a first manifold section having an inlet and a second manifold section having an outlet;

a plurality of refrigerant tubes having refrigerant channels provided therein and communicating at least between the manifold sections;

at least one reservoir for a cold storage medium, wherein at least some of the refrigerant tubes are thermally connected to the cold storage medium reservoir; and a fin;

wherein the reservoir is connected on one lateral face to the refrigerant tube and on the other of its lateral faces to the fin.

2. A heat exchanger as claimed in claim 1, wherein at least one refrigerant tube is arranged in such a way that a reservoir for a cold storage medium is arranged on at least one side of a refrigerant tube.

3. A heat exchanger as claimed in claim 2, wherein a reservoir is arranged on only one side of a refrigerant tube.

4. A heat exchanger as claimed in claim 2, wherein reservoirs are arranged on both sides of a refrigerant tube.

5. A heat exchanger as claimed in claim 1, wherein the components of the heat exchanger, in a direction transverse to the direction of the air flow through the heat exchanger, have an arrangement order comprising: refrigerant tube, reservoir, fin, reservoir, refrigerant tube, reservoir, fin, reservoir, refrigerant tube.

6. A heat exchanger as claimed in claim 1, wherein at least one reservoir and at least one refrigerant tube are connected to one another.

7. A heat exchanger as claimed in claim 1, wherein at least one reservoir and at least one refrigerant tube are integrally formed.

8. A heat exchanger suitable for use as an evaporator, comprising:

a pair of manifold sections, with a first manifold section having an inlet and a second manifold section having an outlet;

a plurality of refrigerant tubes having refrigerant channels provided therein and communicating at least between the manifold sections;

at least one reservoir for a cold storage medium, wherein at least some of the refrigerant tubes are thermally connected to the cold storage medium reservoir; and a fin;

wherein the refrigerant tube is connected at one lateral face to a reservoir and on the other of its lateral faces to the fin.

9. A heat exchanger as claimed in claim 8, wherein at least one refrigerant tube is arranged in such a way that a reservoir for a cold storage medium is arranged on at least one side of a refrigerant tube.

10. A heat exchanger as claimed in claim 9, wherein a reservoir is arranged on only one side of a refrigerant tube.

11. A heat exchanger as claimed in claim 8, wherein at least one reservoir and at least one refrigerant tube are connected to one another.

12. A heat exchanger as claimed in claim 8, wherein at least one reservoir and at least one refrigerant tube are integrally formed.

13. A heat exchanger suitable for use as an evaporator, comprising:

a pair of manifold sections, with a first manifold section having an inlet and a second manifold section having an outlet;

a plurality of refrigerant tubes having refrigerant channels provided therein and communicating at least between the manifold sections;

at least one reservoir for a cold storage medium, wherein at least some of the refrigerant tubes are thermally connected to the cold storage medium reservoir; and a fin;

wherein the components of the heat exchanger, in a direction transverse to the direction of the air flow through the heat exchanger, have an arrangement order comprising: refrigerant tube, reservoir, fin, refrigerant tube, reservoir, fin.

14. A heat exchanger as claimed in claim 13, wherein at least one refrigerant tube is arranged in such a way that a reservoir for a cold storage medium is arranged on at least one side of a refrigerant tube.

15. A heat exchanger as claimed in claim 14, wherein a reservoir is arranged on only one side of a refrigerant tube.

16. A heat exchanger as claimed in claim 13, wherein at least one reservoir and at least one refrigerant tube are connected to one another.

17. A heat exchanger as claimed in claim 13, wherein at least one reservoir and at least one refrigerant tube are integrally formed.

* * * * *